Sept. 6, 1960  J. E. JACOBS  2,951,898
ICONOSCOPE
Filed May 25, 1953  2 Sheets-Sheet 1
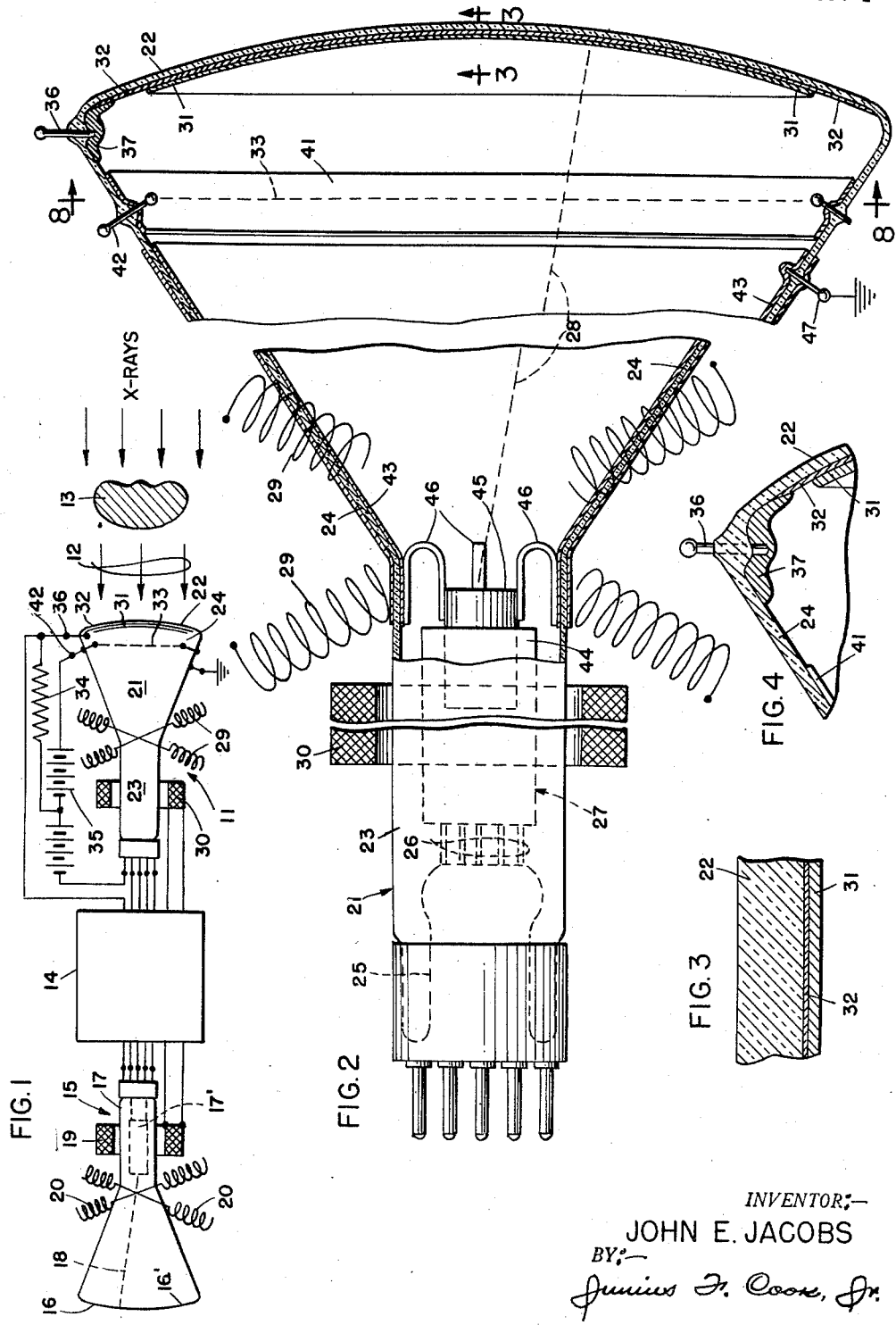
INVENTOR:—
JOHN E. JACOBS
BY:—
*Junius F. Cook, Jr.*
ATTORNEY

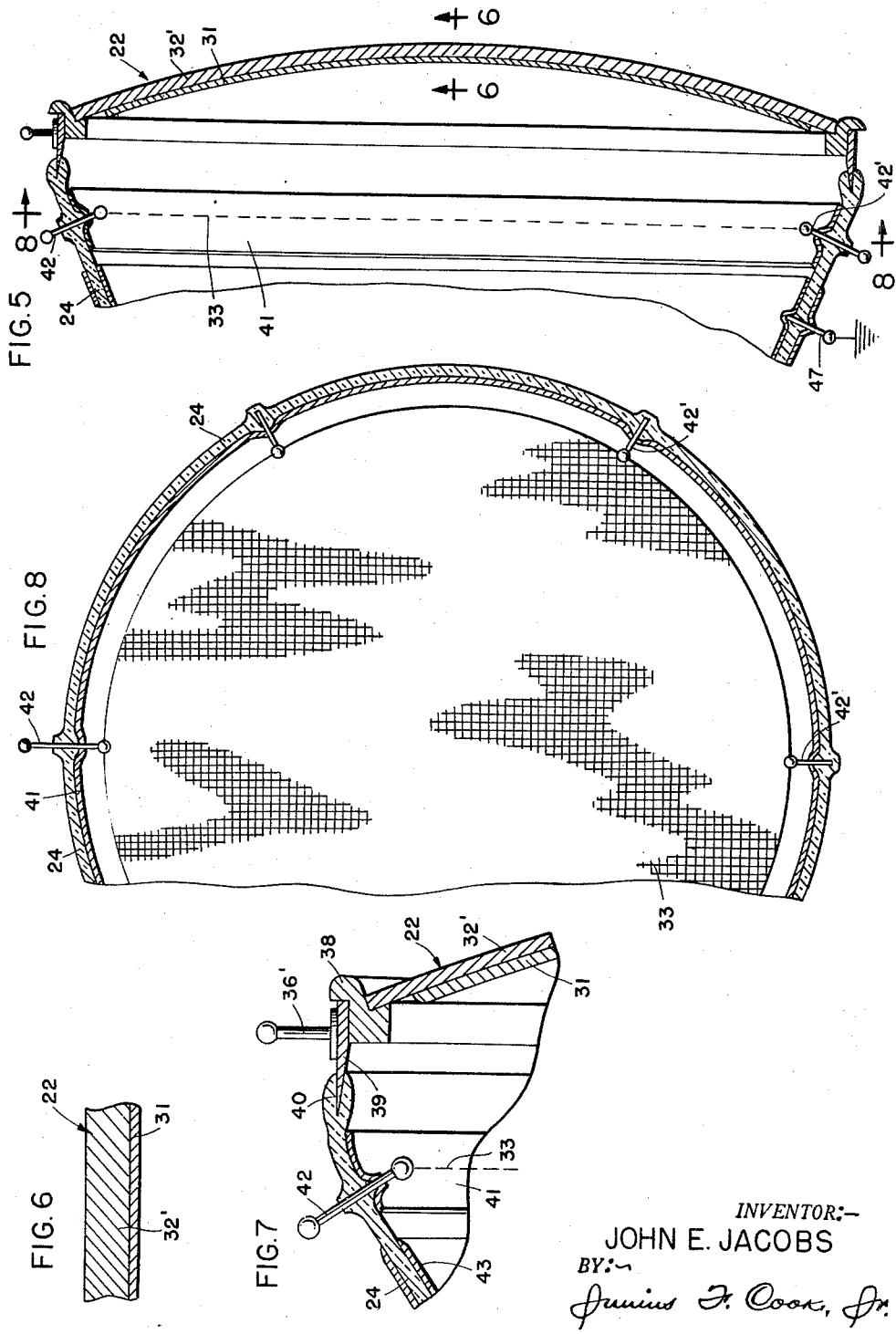

United States Patent Office 2,951,898
Patented Sept. 6, 1960

2,951,898
ICONOSCOPE

John E. Jacobs, Milwaukee, Wis., assignor to General Electric Company, a corporation of New York Filed May 25, 1953, Ser. No. 357,222

6 Claims. (Cl. 178—6.8)

The present invention relates in general to electronics, and has more particular reference to the production, in visible condition, of images latently carried in penetrating rays, such as X-rays, the invention pertaining more especially to improved means for and methods of producing electrical impulses corresponding with latent images entrained or carried in a beam of penetrating rays, and adapted for application to a picture reproducing tube of the sort commonly employed for television picture reproducing purposes to thereby cause production of a visible picture corresponding with the latent ray carried image.

It should be understood that a latent invisible picture or image of an object may be formed or entrained in a beam comprising invisible penetrating rays, such as X-rays, gamma rays, rays comprising alpha or beta particles or neutrons, or other invisible ray-like emanations of penetrating character, by causing the rays comprising the beam to traverse or scan an object to be pictured. Such latent ray carried picture image may then be reduced to visible form by photographic procedures, as by applying the latent image carrying ray beam upon a ray sensitive film, as is common in X-ray photography or radiography, for example. It is also conventional, as in X-ray fluoroscopy, to convert a ray carried latent picture image to visible form by applying the ray directly upon a ray sensitive screen of fluorescent material adapted to glow differentially in proportion to the intensity of ray impingement thereon, and hence to reproduce the latent ray carried image as a visible shadow picture on the ray sensitive screen.

Both of the foregoing procedures involve the application of the ray carrying beam directly upon the sensitive film or screen in which the visible picture is created; and in order to thus produce a visible picture of satisfactory quality, it is frequently necessary to employ image carrying rays of relatively high intensity in order to adequately excite the ray sensitive film or screen for picture production. The employment of such high intensity rays represents a hazard to the operator of the picture producing equipment, especially where, as in X-ray fluoroscopy, the resulting visible picture must be viewed from a viewing station closely adjacent and opposite the screen. Furthermore, where the object being pictured is a living thing, the required ray quanta for optimum picturing purposes may be of dangerously high value, representing a hazard to the living picture object.

According to the present invention, radiation such as X-rays carrying a latent picture image is caused to impinge upon a layer of ray sensitive photo-conductive material that is not normally electron emissive. An electron beam is made to scan the layer in order to cause secondary emission varying in accordance with the amount of ray impingement and therefore corresponding to the latent image. Measurement of the secondary emission is accomplished by a screen electrode which may pass the secondary emission current to conventional television apparatus for visual reproduction of the latent image.

An important object of the present invention is to provide means for and method of producing visual pictures, corresponding with images of objects to be pictured, latently carried by X-rays or other penetrating rays, at a remote picturing station to which the image carrying rays may not penetrate, thereby eliminating the hazard of penetrating ray impingement upon the observer of the visible picture reproduced at such remote station.

Another important object of the present invention is to provide means for and method of producing visual pictures, corresponding with picture images latently carried by X-rays or other penetrating rays, whereby sharp, intense and satisfactory visible pictures may be produced from latent image carrying rays of relatively low intensity within safe limits for use in connection with living objects.

Another important object is to provide improved methods of and apparatus for producing electrical impulses corresponding with a latent ray carried image and adapted for application to a picturing tube of the sort commonly employed for television picture reproducing purposes.

Another important object resides in producing electrical impulses corresponding with latent ray carried images, by applying image carrying rays upon a layer of ray sensitive material having impedance characteristics which fluctuate precisely in accordance with the intensity of image carrying rays impinging thereon, and by providing for the measurement of impedance variations in each integral portion of the layer, in terms of electrical current flow therein, in order to produce electrical impulses corresponding with the degree of ray excitation of the layer, and hence of the latent picture image carried by the layer exciting rays; a further object being to provide for electronically scanning the layer with a pencil-like scanning beam in order thus to measure, progressively and successively, preferably in rapidly repetitive fashion, the momentary impedance characteristics of each integral portion of the layer, and thereby develop electrical impulses, in a circuit associated with the scanning beam, the electrical impulses so developed representing measurements of the momentary impedance values of the integral portions of the layer, and hence corresponding with the latent image carried by the rays applied to the layer.

A further object of the invention is to employ a crystalline semi-conductor material having self-amplifying characteristics as a ray sensitive layer in the iconoscope of the present invention; a further object being to employ material adapted to release electrical energy therein at intensities many times that of the layer exciting image carrying ray, to thereby produce in the layer of semiconductor material amplified or intensified electrical impulses corresponding with the image to be visually reproduced by the action of such amplified impulses upon a picture producing tube of the character heretofore mentioned.

A further object is to form the ray sensitive layer of material comprising finely divided crystals of cadmium sulphide, mercury sulphide, or cadmium selenide, the same having the desired amplifying characteristics and being capable, when excited by penetrating rays, such as X-rays, of releasing electrons in the material in proportion to the degree of ray excitation thereof.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a diagrammatic view showing apparatus for producing visible images in accordance with the teachings of the present invention;

Fig. 2 is an enlarged sectional view taken through an iconoscope embodying the present invention and forming a part of the apparatus shown in Fig. 1;

Fig. 3 is a sectional view taken substantially along the line 3—3 in Fig. 2;

Fig. 4 is an enlarged sectional view illustrating a portion of the structure shown in Fig. 2;

Fig. 5 is a sectional view illustrating a modified form of the device;

Fig. 6 is a sectional view taken substantially along the line 6—6 in Fig. 5;

Fig. 7 is an enlarged sectional view illustrating a portion of the device shown in Fig. 5; and Fig. 8 is a sectional view taken substantially along the line 8—8 in Fig. 5.

To illustrate the invention the drawings show picture producing apparatus comprising an iconoscope 11 adapted to receive penetrating rays 12, such as X-rays, emanating from any suitable ray source and latently carrying the image of an object 13 disposed in the path of the rays 12, between the ray source and the iconoscope. The iconoscope is adapted to produce electrical impulses corresponding with the characteristics of the image of the object 13 latently carried by the rays 12, the iconoscope being interconnected with a suitable translation system 14 for transmitting such electrical impulses to and applying the same upon a picture tube 15 of the sort commonly employed for television picture producing purposes, whereby to operate the same for the production of a visible picture corresponding with the latent image carried by the rays 12 and applied on the iconoscope 11.

The tube 15 may comprise a sealed and evacuated envelope having an enlarged end providing a wall 16 of transparent material, such as glass, and embodying a picture producing screen 16' of fluorescent material adapted to glow in response to electron impingement thereon, the envelope, remote from the end thereof, forming a barrel 17 containing a suitable electron gun structure 17' for generating and applying a pencil-like scanning beam 18 upon the picture producing screen at the wall 16. The picture producing tube 15 also may include associated beam deflecting means of any suitable or preferred character, including electrostatic deflecting plates within the envelope. As shown, however, deflection of the beam 18 for scanning purposes is preferably accomplished by focusing and deflecting coils 19 and 20, mounted outwardly of the envelope and adapted to direct the scanning beam upon, and to cause the same to progressively and successively traverse, the fluorescent screen at the end wall 16 in accordance with a selected scanning pattern, to thereby excite the screen to glow. The fluorescent material of the screen is adapted to glow, at the place of impingement of the beam, in accordance with the fluctuating intensity of the scanning beam, and consequently will produce a picture in said screen visible outwardly of the tube through the transparent end wall 16.

The production of such picture is, of course, controlled in accordance with fluctuating electrical impulses applied to the electron gun 17' for the production and intensity control of the electron beam 18, and to the focusing and deflecting coils 19 and 20 for controlling the scanning movement of the beam 18 in accordance with well known television picture reproducing procedures, electrical impulses, as shown in Fig. 1, being applied to the electron gun 17' and the coils 19 and 20 through the translation system 14.

In order to develop electrical impulses for the operation of the picture producing tube 15 in producing a visible picture corresponding with the latent picture image of the object 13, the iconoscope 11, as shown more particularly in Figs. 2 and 3, may comprise a sealed and evacuated envelope 21 having a sleeve-like body enlarged at one end to form an end wall 22, providing a latent image pickup station adapted to be disposed in the path of the image carrying rays 12. As shown, the sleeve-like body may comprise a tubular portion 23 forming the end of the envelope remote from the end wall 22, and a tapered or flared portion 24 extending between and integrally connected with the marginal edges of the end wall 22 and the facing end of the sleeve portion 23, the opposite end of the portion 23 having a re-entrant envelope portion 25 carrying electrical conductors 26 sealed therein and extending inwardly and outwardly of the envelope.

The envelope 21 contains a suitable electron gun structure 27 of any preferred form, the gun structure being preferably mounted within the sleeve portion 23 of the envelope and electrically connected with the conductors 26, whereby the gun structure, through the conductors 26, may be electrically connected with the translation means 14 outwardly of the envelope 21. The gun structure, of course, includes a suitable electron emission element and electron guiding means for producing an electron beam 28 of pencil-like character, and for applying the same upon the end wall 22.

The iconoscope may also include means for deflecting the beam 28 to cause the same to traverse the end wall 22 in accordance with a selected scanning pattern. While deflection of the beam 28 may be accomplished by any preferred means, including electrostatic deflecting plates within the envelope 21, as is conventional in scanning equipment, beam deflection for scanning purposes is preferably accomplished by means of conventional electromagnetic deflecting coils 29 mounted outwardly of the envelope, as at the junction of the sleeve and flared envelope portions 23 and 24; and the apparatus may include an electromagnetic beam focusing coil 30, disposed in position encircling the sleeve portion 23 of the envelope opposite the electron gun structure 27 and adjacent the deflection coils 29.

The end wall 22, which comprises the latent image pickup station, may embody a layer 31 of semi-conductor material that is responsive to penetrating rays, such as X-rays, latently carrying picture images to be reproduced in visible form, as at the screen 16' of the image reproducing tube 15, the layer 31 being preferably coated upon the inner surface of the end wall 22 in position to be scanned by the beam 28. The layer 31 is preferably coated upon a layer of electrical conducting material embodied in the wall structure 22.

As shown more particularly in Figs. 2 and 4, the envelope 21, including the end wall 22 thereof, may be made of glass. The end wall 22, accordingly, may comprise a pane or panel of glass forming an integral end wall portion of the envelope 21. In such case, the inwardly facing surface of the end wall may be coated with a thin layer 32 of aluminum, stannic chloride ($SnCl_2$), or other suitable conducting material adapted to be applied as a coated layer on the inner surface of the glass end wall 22; and the layer 31 may be coated upon the layer 32.

As shown in Figs. 3 and 5, the barrel, tapered and re-entrant portions 23, 24 and 25 of the envelope may be made of glass, and the end wall 22 may comprise a metal panel 32' hermetically sealed at its marginal edges with the edges of the tapered portion 24; and the layer 31, in such case, may be applied directly upon the inner surface of the metal end wall panel.

For the purpose of the present disclosure, a semi-conductor may be defined as a material having electrical resistance, or reactance, or both, which vary in accordance with the intensity of rays to which the substance is exposed. Electrical resistance and reactance, either inductive or capacity reactance, or both, are those characteristics of electrical conductors which tend to prevent or impede the flow of electrical current therethrough under the influence of an electromotive force. The combined flow resistive effect of resistance and reactance in a given conductor material is commonly referred to as the electrical impedance of the material.

In the absence of rays to which it is responsive, a semi-conductor may have impedance characteristics of such high order as to constitute the material as a virtual insulator capable of substantially preventing the flow of electrical current therethrough. When irradiated with rays to which it is responsive, the impedance of the semi-conductor material may be reduced as a proportional function of incident ray intensity, so that the material becomes electrically conducting in proportion to the intensity of exciting rays impinging thereon. As a consequence, such ray induced or controlled change in the impedance of the semi-conductor may be measured to indicate and thus detect the presence of a ray impinging on the semi-conductor.

The impedance of the semi-conductor, of course, may be determined by applying a known voltage to the semi-conductor and measuring the resultant current flow through the semi-conductor. Measurement of such current flow determines the impedance of the semi-conductor, and hence measures the intensity of the impinging ray. Such measurement may be accomplished either directly or indirectly, or, as in the present invention, may be employed to cause electron emission from the semi-conductor comprising the layer 31, the rate of electron emission from each integral portion of the layer 31 corresponding with the intensity at which the rays 12 impinge upon the layer, whereby such electronic emission from the layer forms a converted latent image of that contained in the impinging rays 12.

Perhaps the most widely known semi-conductors are those which are particularly responsive to visible light, and to invisible rays, such as infrared and ultraviolet rays, having wave length in the light spectrum immediately adjacent to that of visible light, such semi-conductors being virtual insulators except when exposed to light rays in the visible portions of the spectrum and adjacent infrared and ultraviolet spectral regions. These commonly known semi-conductors, however, are not sufficiently responsive to X-rays, and similar penetrating rays of the sort herein mentioned, to allow the useful application thereof in the detection of such rays.

In accordance with the present invention, the ray sensitive material forming the layer 31 preferably comprises a crystalline semi-conductor material, such as the sulphide of cadmium, zinc, or mercury, or the selenide of cadmium, the same having amplification characteristics in response to impingement thereon of the penetrating rays 12, said materials being also capable of electron emission from the layer 31 in proportion to the intensity of rays 12 impinging thereon. The characteristics of such semi-conductors and the manner of applying the same for the effective detection of X-rays is taught in co-pending applications for U.S. Letters Patent, Serial No. 190,801 of October 18, 1950, now Patent No. 2,706,790, Serial No. 228,333 of May 25, 1951, and Serial No. 232,073, of June 18, 1951, now Patent No. 2,706,791; and the present invention comprises an elaboration and extension of the teachings set forth in the aforesaid co-pending applications, by employing such crystalline semi-conductor material in the form of the relatively thin layer 31, whereby to provide for ray detection at each integral portion of the area of the layer 31 and the emission of electrons at each layer portion in proportion to the intensity of the detected ray impinging thereon. Such electron emission from the entire layer may latently carry an image corresponding with the image latently carried by the impinging rays 12, whereby the layer 31 is employed as a ray sensitive iconoscope mosaic.

In order to convert the latent image pattern contained in electrons emitted from the layer 31 to visible form, the device 11 is provided with a collecting screen 33 supported within the envelope 21 in spaced, substantially parallel relationship with respect to the layer 31. As the beam 28 scans the layer 31 it will liberate electrons from the layer for collection on the screen 33. The intensity of rays detected by the screen at the constantly changing scanning area of impact of the beam 28 on the layer 31 will be measured in terms of the impact of released electrons on the collecting screen 33, that is to say, in terms of voltage between the screen 33 and the member 32 or 32'. In order to induce movement of electrons from the layer 31 to the screen 33, a suitable bias potential, as provided by the power source 35, should be maintained between the screen 33 and the layer 32 or 32', as through a resistor 34. In this connection, as shown in Fig. 1, the power source should be connected to bias the screen 33 relatively positive with respect to the layer 31.

Cadmium sulphide is considered to be more suitable for X-ray detection purposes than the other substances mentioned, since it is much more sensitive to X-ray excitation, that is to say, cadmium sulphide releases many more electrons than the other named substances under equal X-ray excitation. While zinc sulphide in this respect is exceedingly inefficient as an X-ray detector as compared with cadmium sulphide, releasing one electron for every hundred thousand electrons released by cadmium sulphide under equal X-ray excitation, zinc sulphide nevertheless may perform usefully as an X-ray detector in iconoscope devices embodying the present invention because zinc sulphide has very much higher resistance characteristics as compared with cadmium sulphide, the electrical resistivity of zinc sulphide being of the order of ten thousand times that of cadmium sulphide.

As a consequence, after release of electrons from an X-ray excited zinc sulphide coating, as the result of scanning the layer with the beam 28, the scanned end of a zinc sulphide crystal will retain its positive potential, assumed at the instant of scanning, as the result of the loss of electrons by secondary emission therefrom, until X-ray absorption releases additional electrons internally in the crystal, thereby permitting the neutralization of the charge placed upon the scanned end of the crystal by the scanning beam. This restoration procedure is relatively slower in zinc sulphide than in cadmium sulphide because of the higher resistance of zinc sulphide. An accumulation or storage of the X-ray detecting effect, accordingly, is permitted in a zinc sulphide layer between successive scannings, to an appreciably greater extent than is the case in a cadmium sulphide layer. This appreciably greater accumulation or storage effect renders zinc sulphide in its over-all performance substantially equal to cadmium sulphide for X-ray camera tube purposes, despite the much lesser absolute efficiency of zinc sulphide as a detector of X-ray excitation.

Semi-conductors operate as such through the release of electrons entrapped in the material, such electron release being accomplished as the result of impingement on the material of rays to which the same is responsive. Commonly known semi-conductors, such as selenium, operate to release electrons in direct proportion to the alteration of the electrical space charge of the substance, as the result of light impingement thereon, and hence do not show amplification characteristics. Cadmium and mercury sulphides and cadmium selenide, however, when exposed to X-rays, operate by releasing many thousands or hundreds of thousands of electrons in response to unit alteration of the space charge therein, thus showing amplification characteristics not found in ordinary semi-conductors, such as selenium. In that connection, each crystal of a conductor having amplification characteristics operates in fashion comparable to the operation of an electron amplifying tube device.

It is thought that the amplifying character of the crystals is due to the fact that the sulphides of cadmium and mercury and the selenide of cadmium comprise what may be termed excess electron or electron donor type semi-conductor materials, wherein the excess energy necessary to produce the amplified current in the crystal is derived from the electron producing character of the material itself, when irradiated or triggered by exposure to its rays to which it is responsive. It is thought that electron donor centers in each crystal are ionized by the exciting rays, thus forming stationary positive space charges.

This phenomenon can be compared to the operation of a conventional electron flow triode tube wherein the grid is assumed to be floating. In such a tube the grid takes a negative charge from the electron stream flowing in the tube, thus reducing the plate current to a small value. However, if the grid be charged positively, the current flow in the tube will increase. In the crystal material the conduction electrons are, to a great extent, localized in traps, thus forming the current reducing stationary negative space charge. When an exciting ray impinges upon the crystal, the electron donor centers become ionized, thus assuming positive charges. The stationary positive charges thus created in the crystal are thought to act in the same way as does a positive charge applied upon the grid of a triode tube. One positive hole or station thus created in the crystal appears to control the flow of more than 10,000 electrons in the crystal. This is in contradistinction to ordinary semi-conductors, such as selenium, wherein this amplification mechanism is absent. In donor type semi-conductors, electrical energy is consequently released in the form of current in the crystal that is many times the energy applied to the crystal by the exciting ray. Accordingly, each minute zone of the layer 31 comprises a crystal fragment which provides a tiny amplifier capable of delivering a substantial quantity of electrons in proportion to the intensity of the ray impinging thereon.

In order to employ the layer 31 for electron emitting purposes, the same may be formed on one side thereof in intimate electrical contact with the sheet or film of electrical conducting material 32 or 32'. The crystalline material, of which the layer 31 is constituted, is preferably in finely divided condition, the same being pulverized to produce the material in granular form of desired fineness. To this end, the material may be comminuted substantially to a powdery or dust-like condition and mixed with a suitable liquid carrier and binder, such as lacquer, care being taken to thin the carrier to a free flowing condition so that the mixture may be applied as a thin film upon the metal film or panel 32 or 32', whether the same comprises a film adhered to the glass end wall of the envelope 21, as shown in Figs. 2 and 4, or comprises a metal panel forming the end wall of the envelope, as shown in Figs. 3 and 5. In the arrangement shown in Fig. 2, the film 32 may comprise suitable electrical conducting material, such as molybdenum, silver, aluminum, or other metal applied upon the inner surface of the glass end wall 22, as by flashing, spraying or sputtering procedures.

Lacquer, as a carrier and binder containing the comminuted crystalline material in suspension therein, may be applied as a thin layer, as by painting the same upon the surface of the metal film or panel 32 or 32'. The painted film may then be permitted to dry out in situ by exposure to air at normal atmospheric temperature, such drying being continued over a period of the order of 36 hours. If desired, an additional layer or layers of lacquer, carrying comminuted crystalline material, may be applied upon the previously applied layer or layers and allowed to dry, in order to build up the crystalline material to desired thickness.

The so coated end wall may then be placed in a vacuum chamber, such as a bell jar containing a heater, in position to cook the layer 31. Means may be provided to regulate the heating effect applied to the layer 31 in order to cause visible boiling of the remaining evaporable components of the binder in the layer. The heating of the layer 31 under vacuum conditions should be continued until visible boiling of the binder ceases, after which the layer may be allowed to cool slowly in the vacuum chamber. Under normal conditions, the layer 31 should be cooked during a period of the order of a few minutes, after which it should be allowed to cool off in the vacuum chamber during a period of the order of several hours. The resulting layer of crystal material may have a thickness of the order of 0.015 inch or less, although layers of greater thickness may be employed. The layer 31 of crystalline material thus produced is strongly adherent upon the end wall 22 and may be removed therefrom only by use of a sharp edged scraping tool.

It will be appreciated that, for precision production of a converted latent image comprising electron emission from the layer 31 at various emission intensities corresponding with the picture image being translated, each crystal or crystal fragment comprising the layer 31 should have impedance characteristics under excitation of the penetrating rays 12 substantially identical with the response characteristics of all of the other crystals or crystal fragments comprising the layer. The impedance variation, and electron emissivity, in response to irradiation exhibited by heretofore available crystals of the substances mentioned is not at all uniform. Considerable difficulty, therefore, has been encountered in attempting to apply crystals of the named materials for X-ray detection purposes generally, and for the visual picture producing purpose of the present invention in particular, since the response of each individual crystal, of the sort heretofore available, to irradiation is usually different from that of other apparently identical crystals. It is for this, as well as other reasons that the application of crystalline semi-conductors, having amplifying characteristics for the purpose of the detection of penetrating rays, was heretofore considered to be a practical impossibility prior to the discoveries and inventions set forth in the aforesaid copending applications.

For these reasons, it is desirable to employ in the layer 31 crystalline semi-conductor material of the sort described in copending application for U.S. Letters Patent Serial No. 269,276, filed January 31, 1952, wherein is described means for and method of synthesizing crystals of the character herein contemplated, in fashion assuring substantial uniformity in the reaction of the crystals to irradiation by penetrating rays, such as X-rays. In this connection, it is thought that the variation of crystal impedance and electron emissivity is due, in part at least, to lattice irregularities or distortions in the crystal structure and to the occurrence in the crystals of minute quantities of contaminant foreign material, uniformity of response being accomplished by producing crystalline material, under carefully controlled conditions, whereby all of the crystals may contain lattice irregularities or distortions and contaminant foreign material in quantity that is substantially the same in all crystals.

In order to provide for connecting the layer 31 in the translation system 14, a conductor stem or stems 36, as shown more particularly in Fig. 2, may be sealed in and extend through the walls of the envelope 21 at the margin of the conducting layer 32, the inwardly extending ends of said stems 36 being electrically connected with the layer 32 and hence with the facing surface of the layer 31, as by means of preferably graphitic electrical conducting paint 37.

As shown more particularly in Fig. 5 of the drawings, the metal panel 32' may be sealingly secured at its marginal edge in a metal mounting ring 38, which, in turn, may be sealingly secured to a shell-like ring 39 of metal adapted to be sealed with glass. The edge of the ring 39 remote from the mounting ring 38 may be tapered and joined to the end edge of the sleeve-like glass body portion 24 of the envelope by means of a glass-metal seal 40. In such arrangement, connection terminals 36' may be electrically connected with the ring 39 or the ring 38, or indeed with the panel 32', in order to provide for electrically connecting the layer 31 in the electrical translation system 14.

The collection screen 33 may comprise a woven metal fabric screen of 100–1000 mesh, mounted within a collector ring 41 supported upon the inner surface of the wall portion 24. Said collector ring may comprise a layer of conducting material, such as silver, graphitic paint such as aquadag, or other conducting material applied as a band upon the inner surface of the wall portion 24 at the envelope opposite the edges of the screen 33. At peripherally spaced intervals around the envelope, conductor stems 42 may be sealed in and extend through the envelope wall 24 and through the collector ring 41, the marginal edges of the screen 33 being secured mechanically and electrically at intervals on said peripherally spaced stems 42. The stems 42 thus are electrically connected with the screen 33 and with the collector ring 41, and may be employed to electrically connect said elements in the translation system 14.

If desired, the interior surfaces of the envelope wall 24 may be provided with a post acceleration electrode comprising a coating 43 of electrical conducting material, such as graphitic paint, extending from adjacent the collector ring 41 and within the end of the envelope portion 23 at the electron emitting end of the gun 27. Said gun 27 may include a primary anode 44 and a secondary anode 45 disposed within the discharge end of the gun structure, electrically insulated therefrom and connected with the post accelerator electrode 43 by means of mounting strips 46, as of spring steel, for supporting the anode 45 and electrically connecting the same with said accelerator electrode 43. One or more electrical conducting stems 47, sealed in and extending through the envelope wall 24 and electrically connected with the accelerator electrode 43, may be provided for electrically connecting said electrode to ground or otherwise outwardly of the envelope. It may also be desirable to apply an external coating of electrical conducting material, such as aquadag or like graphitic paint, upon the outwardly facing surfaces of the envelope 21, such outer coating being electrically connected to ground and electrically insulated from the conducting stems 36 and 42.

When the iconoscope of the present invention is in operation, a constantly fluctuating potential will be developed across the resistor 34 as the result of secondary electron emission from the layer 31 upon the collector screen 33 in response to the scanning of the screen by the electron beam emitted from the gun 27. The fluctuating voltage thus created will correspond exactly with the latent image applied upon the sensitive layer 31 by the impinging rays 12. The fluctuating voltage thus developed may be applied in synchronism with the scanning movement of the beam to control the intensity of the electron beam 18 in the reproducing tube 15, in accordance with known television procedures.

The device of the present invention, accordingly, is adapted to pick up latent ray carried images and to transfer the same directly to conventional television picture reproducing apparatus. The iconoscope of the present invention comprises a tube having a ray sensitive screen embodying the sulphide of cadmium, mercury or zinc, or the selenide of cadmium, cadmium sulphide being the preferred sensitive material.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

I claim:

1. Apparatus for translating latent ray carried images comprising means forming a layer of ray sensitive semi-conductive material adapted to be interposed in the path of image carrying rays, a foraminous layer of electrical conducting material forming a collecting electrode overlying the layer of semi-conductive material in parallel spaced apart relation therewith, means for electronically scanning said layer through said foraminous collecting electrode in order to induce secondary electron emission from said layer in accordance with the ray carried image applied thereto, and means for positively biasing the collecting electrode with respect to the layer, to thereby produce a fluctuating signal embodying an electrical translation of the image.

2. Apparatus as set forth in claim 1, wherein the layer of semi-conductive material comprises a crystalline substance selected from the class consisting of the sulphide and selenide of cadmium.

3. Apparatus as set forth in claim 1, wherein the layer of semi-conductive material comprises a crystalline substance selected from the class consisting of the sulphides of mercury and zinc.

4. Apparatus for translating latent ray carried images comprising a sealed envelope having a screen carrying wall, means forming a layer of ray sensitive semi-conductive material on said wall in position to be interposed in the path of image carrying rays, an electron gun spaced from said screen for electronically scanning said layer with a gun emitted electron beam to induce secondary electron emission therefrom in accordance with the ray carried image applied thereto, a foraminous collecting electrode supported on the walls of said envelope in spaced relation with respect to and overlying the said layer, in the path of said electron beam, in position to collect layer emitted electrons, and means to maintain an electrically positive bias on said electrode with respect to said layer, to thereby produce a fluctuating signal embodying an electrical translation of the image, said screen carrying wall of said envelope comprising glass and a layer of electrical conducting material supported on said wall in superficial contact with said layer.

5. Apparatus for translating latent ray carried images comprising a sealed envelope having a screen carrying wall, means forming a layer of ray sensitive semi-conductive material on said wall in position to be interposed in the path of image carrying rays, an electron gun spaced from said screen for electronically scanning said layer with a gun emitted electron beam to induce secondary electron emission therefrom in accordance with the ray carried image applied thereto, a foraminous collecting electrode supported on the walls of said envelope in spaced relation with respect to and overlying the said layer, in the path of said electron beam, in position to collect layer emitted electrons, and means to maintain an electrically positive bias on said electrode with respect to said layer, to thereby produce a fluctuating signal embodying an electrical translation of the image, said screen carrying wall of said envelope comprising a panel of metal with which said layer is in superficial electrical contact.

6. Apparatus for translating latent ray carried images comprising a sealed envelope having a screen carrying wall, means forming a layer of ray sensitive semi-conductive material on said wall in position to be interposed in the path of image carrying rays, an electron gun spaced from said screen for electronically scanning said layer with a gun emitted electron beam to induce secondary electron emission therefrom in accordance with the ray carried image applied thereto, a foraminous electrode supported on the walls of said envelope in spaced relation with respect to and overlying the said layer, in the path of said electron beam, in position to collect layer emitted electrons, means to maintain an electrically positive bias on said electrode with respect to said layer, to thereby produce a fluctuating signal embodying an electrical translation of the image, said electrode comprising a woven wire panel having edges conforming with the enclosing walls of the envelope, means supporting said wire panel at its marginal edges on said walls at circumferentially spaced anchoring stations on said envelope walls, and a ring of electrical conducting material secured on said walls in position encircling the marginal edges of the wire panel, said ring being electrically interconnected with said wire panels at said anchoring stations.

References Cited in the file of this patent

UNITED STATES PATENTS

| Number | Name | Date |
|---|---|---|
| 2,169,840 | Lewis et al. | Aug. 15, 1939 |
| 2,319,195 | Morton | May 11, 1943 |
| 2,423,124 | Teal | July 1, 1947 |
| 2,442,287 | Edwards | May 25, 1948 |
| 2,517,807 | Sziklai | Aug. 8, 1950 |
| 2,523,132 | Mason et al. | Sept. 19, 1950 |
| 2,555,424 | Sheldon | June 5, 1951 |
| 2,555,545 | Hunter et al. | June 5, 1951 |
| 2,612,610 | Marshall et al. | Sept. 30, 1952 |
| 2,645,721 | Williams | July 14, 1953 |
| 2,654,853 | Weimer | Oct. 6, 1953 |
| 2,747,131 | Sheldon | May 22, 1956 |

FOREIGN PATENTS

| Number | Country | Date |
|---|---|---|
| 604,198 | Great Britain | June 30, 1948 |

OTHER REFERENCES

Photoelectricity by Zworykin and Ramberg, Wiley and Sons, New York, 1949, page 195.

Physical Review, vol. 76, number 12, Dec. 15, 1949, "On the Conductivity Produced in CdS Crystals by Irradiation with Gamma Rays" (pages 1869–1875).

UNITED STATES PATENT OFFICE
CERTIFICATE OF CORRECTION

Patent No. 2,951,898            September 6, 1960

John E. Jacobs

It is hereby certified that error appears in the printed specification of the above numbered patent requiring correction and that the said Letters Patent should read as corrected below.

Column 11, line 3, after "foraminous" insert -- collecting --.

Signed and sealed this 11th day of April 1961.

(SEAL)
Attest:
ERNEST W. SWIDER
Attesting Officer

ARTHUR W. CROCKER
Acting Commissioner of Patents